US011101896B2

(12) United States Patent
Kowalevicz et al.

(10) Patent No.: US 11,101,896 B2
(45) Date of Patent: Aug. 24, 2021

(54) INTEGRATED OPTICAL RESONANT DETECTOR

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/380,269

(22) Filed: Apr. 10, 2019

(65) Prior Publication Data

US 2019/0319715 A1 Oct. 17, 2019

Related U.S. Application Data

(60) Provisional application No. 62/656,811, filed on Apr. 12, 2018.

(51) Int. Cl.
*H04B 10/67* (2013.01)

(52) U.S. Cl.
CPC ......... *H04B 10/671* (2013.01); *H04B 10/676* (2013.01)

(58) Field of Classification Search
CPC ..... H04B 10/671; H04B 10/676; H04B 10/54
USPC ....................................................... 398/202
See application file for complete search history.

(56) References Cited

U.S. PATENT DOCUMENTS

| 5,550,373 | A | * | 8/1996 | Cole | G01J 3/02 |
| | | | | | 250/338.1 |
| 2002/0071184 | A1 | * | 6/2002 | Nishi | G02B 5/20 |
| | | | | | 359/578 |
| 2003/0138008 | A1 | * | 7/2003 | Riaziat | H01S 5/02212 |
| | | | | | 372/36 |
| 2003/0151818 | A1 | * | 8/2003 | Wagner | G02B 6/4214 |
| | | | | | 359/578 |
| 2003/0227949 | A1 | | 12/2003 | Meyers | |
| 2004/0062945 | A1 | * | 4/2004 | Domash | G02B 5/284 |
| | | | | | 428/641 |
| 2007/0291115 | A1 | * | 12/2007 | Bachelder | G08B 13/1966 |
| | | | | | 348/143 |
| 2008/0187268 | A1 | * | 8/2008 | Kaneko | G02B 6/12007 |
| | | | | | 385/27 |
| 2008/0237835 | A1 | * | 10/2008 | Togami | H01L 23/045 |
| | | | | | 257/698 |
| 2009/0304390 | A1 | * | 12/2009 | Tanushi | H04B 10/801 |
| | | | | | 398/139 |

(Continued)

FOREIGN PATENT DOCUMENTS

| JP | H11204823 A | 7/1999 |
| WO | 2018064139 A1 | 4/2018 |

*Primary Examiner* — Dalzid E Singh
(74) *Attorney, Agent, or Firm* — Lando & Anastasi, LLP

(57) ABSTRACT

Photo-resonator optical detectors and optical receiver systems incorporating same. In one example, an optically resonant detector includes a housing having an optical window, a photodetector disposed within the housing, and an optical resonator disposed in optical alignment with the photodetector within the housing and positioned between the optical window and the photodetector, the optical resonator being configured to receive an input optical signal via the optical window and to provide an output optical signal to the photodetector.

22 Claims, 7 Drawing Sheets

(56) References Cited

U.S. PATENT DOCUMENTS

| | | | |
|---|---|---|---|
| 2012/0269523 A1* | 10/2012 | McCallion | H04L 27/223 |
| | | | 398/202 |
| 2015/0304053 A1 | 10/2015 | Pfnuer et al. | |
| 2016/0006211 A1* | 1/2016 | Kim | H01S 5/02415 |
| | | | 372/20 |
| 2016/0112776 A1* | 4/2016 | Kim | G02F 1/0147 |
| | | | 398/48 |
| 2016/0118769 A1* | 4/2016 | Narumi | H01S 3/042 |
| | | | 372/34 |
| 2016/0245697 A1* | 8/2016 | Shibayama | G01J 3/0286 |
| 2016/0282181 A1* | 9/2016 | Shibayama | G01J 3/0286 |
| 2017/0085970 A1* | 3/2017 | Zhang | H04Q 11/0005 |
| 2018/0011232 A1* | 1/2018 | Kawai | G01J 5/041 |
| 2018/0054259 A1 | 2/2018 | Kowalevicz et al. | |
| 2018/0065259 A1 | 3/2018 | Gibbs | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0113024 A1* | 4/2018 | Hirose | G01J 3/26 |
| 2018/0145764 A1 | 5/2018 | Dolgin et al. | |
| 2018/0145765 A1 | 5/2018 | Kowalevicz et al. | |
| 2018/0167145 A1 | 6/2018 | Dolgin et al. | |
| 2018/0224332 A1* | 8/2018 | Ooi | G01J 3/0229 |
| 2018/0234231 A1 | 8/2018 | Dolgin et al. | |
| 2018/0367223 A1 | 12/2018 | Graceffo et al. | |
| 2019/0007091 A1 | 1/2019 | Graceffo et al. | |
| 2019/0158208 A1 | 5/2019 | Dolgin et al. | |

\* cited by examiner

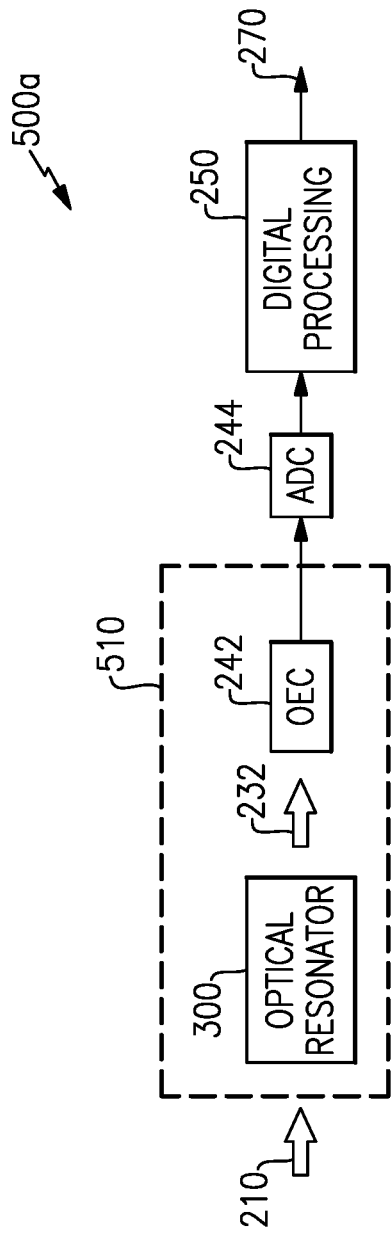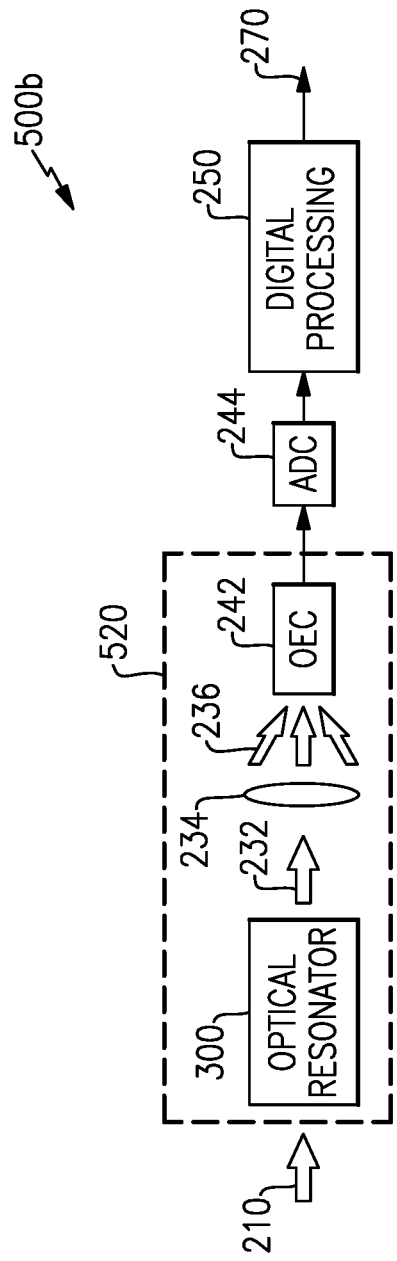

INTEGRATED OPTICAL RESONANT DETECTOR

CROSS REFERENCE TO RELATED APPLICATIONS

This application claims the benefits under 35 U.S.C. § 119(e) and PCT Article 8 to U.S. Provisional Application No. 62/656,811 filed on Apr. 12, 2018 and titled "INTEGRATED OPTICAL RESONANT DETECTOR," which is herein incorporated by reference in its entirety for all purposes.

BACKGROUND

Light waves may carry information by modulation, such as by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and/or information may be recovered.

Various modulation of light signals may include phase modulation and amplitude modulation. Information encoded in phase and amplitude modulation may include transmitted communication data, or may include other information such as information about the source of the optical signal, interaction of the optical signal with an object and/or the optical channel through which the optical signal travels. Conventional receivers capable of demodulating phase modulation can be highly complex, requiring precision optics, local oscillators, gratings (such as Fiber Bragg Gratings), and/or delay line interferometers (DLI), etc. Receivers for high-order coherently encoded signals generally require multiple detectors, frequency controlled lasers as local oscillators (LO), and significant digital signal processing (DSP).

SUMMARY OF INVENTION

Aspects and examples described herein provide systems and methods for integrating an optical resonator with an optical-electrical converter (e.g., a photodetector, photodiode) to be used for detection and demodulation of optical signals. Certain examples include a photodetector having an optical resonator, such as a Fabry-Perot type filter/resonator/etalon, integrally coupled with the photodetector to form a single unit suitable for incorporation with a processing system to receive and demodulate optical signals.

According to various aspects and embodiments, optical signal receiver components and methods are provided that integrate an optical resonator with a photodetector. The optical resonator is responsive to modulations in an arriving optical signal to provide an intensity modulated output optical signal to the photodetector. The photodetector is responsive to the intensity modulated output optical signal (from the optical resonator) to provide an amplitude modulated electrical signal. The optical resonator and the photodetector may be sufficiently integrally formed and/or aligned at fabrication to be suitable for operation in a receiver system.

According to one embodiment, an optically resonant detector comprises a housing having an optical window, a photodetector disposed within the housing, and an optical resonator disposed in optical alignment with the photodetector within the housing and positioned between the optical window and the photodetector, the optical resonator being configured to receive an input optical signal via the optical window and to provide an output optical signal to the photodetector.

In one example, the optical resonator and the photodetector are integrally formed as a unitary structure inseparable without damage.

In one example, the optically resonant detector further comprises an anti-reflective coating formed on a surface of the optical window.

In one example, the optical resonator is an etalon formed in an interior of the optical window. In another example, the optical resonator is an etalon formed on a surface of the optical window.

In one example, the optically resonant detector further comprises a substrate upon which the photodetector is formed.

In another example, the optically resonant detector further comprises a lens positioned between the optical resonator and the photodetector and configured to focus the output optical signal into the photodetector. In another example, the optically resonant detector further comprises a mechanical actuator configured to adjust a physical position of at least one of the optical resonator, the photodetector, and the lens in response to a control signal.

According to another embodiment, an optical receiver comprises a photo-resonant detector including an integrally formed and optically aligned combination of a photodetector and an optical resonator, the photo-resonant detector being configured to receive an input optical signal and to provide an electrical signal based on the input optical signal, an amplitude modulation of the electrical signal being representative of a modulation of the input optical signal, an analog to digital converter configured to receive the electrical signal from the photo-resonant detector and convert the electrical signal into a digital signal, and a digital processing subsystem configured to receive and process the digital signal.

In one example, the photo-resonant detector further includes a housing having an optical window, the photodetector and the optical resonator being disposed within the housing and arranged such that the optical resonator is positioned between the optical window and the photodetector. In another example, the optical resonator is configured to receive the input optical signal via the optical window and to provide an output optical signal to the photodetector, the photodetector being configured to convert the output optical signal into the electrical signal, the output optical signal having an intensity modulation representative of the modulation of the input optical signal. In one example, the optical resonator is an etalon formed in an interior of the optical window. In another example, the optical resonator is an etalon formed on a surface of the optical window. In another example, the photo-resonant detector further includes an anti-reflective coating formed on a surface of the optical window.

According to another embodiment, an optical receiver comprises a photo-resonant detector including a housing having an optical window, a photodetector disposed within the housing, and an optical resonator disposed in optical alignment with the photodetector within the housing and positioned between the optical window and the photodetector, the optical resonator being configured to receive an input optical signal via the optical window and to provide an output optical signal to the photodetector, the photodetector being configured to convert the output optical signal into an electrical signal, an analog to digital converter configured to receive the electrical signal from the photo-resonant detector and convert the electrical signal into a digital signal, and a digital processing subsystem configured to receive and process the digital signal.

In one example, the optical resonator is an etalon configured to provide the output optical signal having an intensity modulation representative of a modulation of the input optical signal, and wherein the electrical signal has an amplitude modulation representative of the intensity modulation of the output optical signal. In another example, the photo-resonant detector further includes a lens positioned between the optical resonator and the photodetector and configured to focus the output optical signal into the photodetector. In another example, the photo-resonant detector further includes a mechanical actuator configured to adjust a physical position of at least one of the optical resonator, the photodetector, and the lens in response to a control signal.

In one example, the optical resonator and the photodetector are integrally formed as a unitary structure inseparable without damage.

In another example, the photo-resonant detector further includes an anti-reflective coating formed on a surface of the optical window.

According to one embodiment, a method of forming an optically resonant detector includes forming a photodetector, and forming an optical resonator integrated with the photodetector.

In one example, each of the photodetector and the optical resonator are formed using a semiconductor fabrication technique. In one example, forming the optical resonator integrated with the photodetector includes forming the optical resonator upon the photodetector. In another example, forming the optical resonator integrated with the photodetector includes forming the photodetector upon the optical resonator. In another example, one of the optical resonator and the photodetector is formed inside the other of the optical resonator and the photodetector.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIGS. 5A-5B are block diagrams of optical receivers according to various examples described herein;

DETAILED DESCRIPTION

Aspects and embodiments described herein allow for demodulation of complex encoding formats using various optical resonators, and include methods and systems that incorporate an optical resonator with a photodetector.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics. Accordingly, any suitable electromagnetic radiation capable of interacting with a suitable resonator in like manners to those described herein may be included in the terms light, light signal, optical, or optical signal. Further, the terms variation, transition, change, and shift are used interchangeably herein, such as when used for phase variation, phase transition, phase change, and phase shift, or when used for amplitude variation, amplitude transition, amplitude change, and amplitude shift, unless clearly indicated otherwise by context.

Figure 1C:
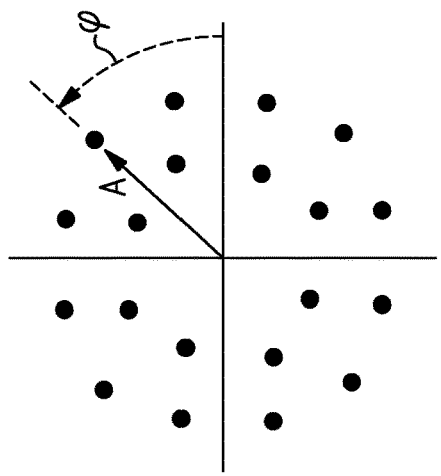
FIGS. 1A-1C are schematic diagrams of constellations for various modulation schemes.
Figure 1B:
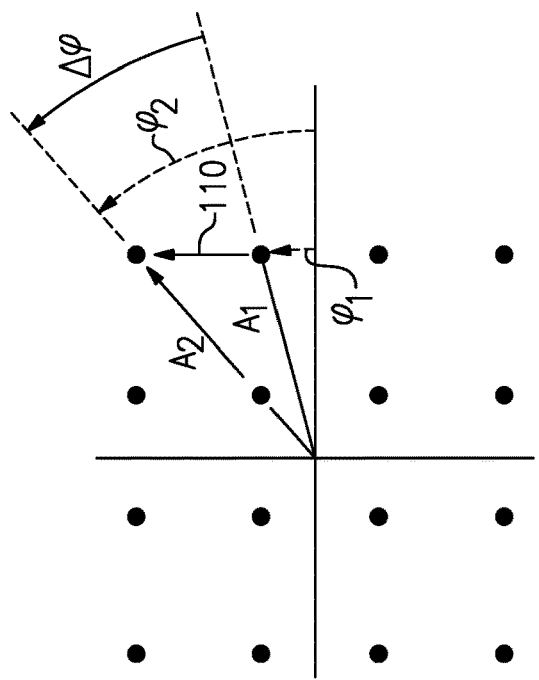
Figure 1A:
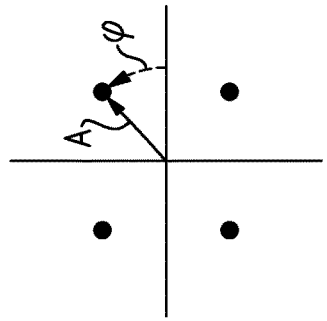

FIGS. 1A-1C illustrate examples of signal constellations for various modulation schemes, including QPSK (FIG. 1A) and QAM (FIGS. 1B-1C). The constellations shown, as well as lower and higher order constellations of M-PSK and QAM, may be accommodated, detected, and demodulated by receivers incorporating the systems and methods described herein. Each point on each constellation represents an optical signal having a certain amplitude, A, and phase, $\Phi$. A transition from one point to another point on each constellation may include a change in amplitude, a change in phase, or both. For example, the modulation transition 110 includes a change in amplitude of $\Delta A=A_2-A_1$ and a change in phase of $\Delta\varphi=\varphi_2-\varphi_1$. A receiver that tracks changes in amplitude and phase may also thereby track absolute amplitude and phase of a received optical signal, with reference to an arbitrary starting phase, for instance.

Any phase or amplitude shift may cause a variation in the output signal of a resonator. For example, a phase shift may cause a transient disturbance in the output while an amplitude shift may cause the output to settle at a new output intensity. Accordingly, the output signal intensity from an optical resonator may carry information similar to that carried by phase and amplitude modulations of an arriving optical signal. Further, the output signal intensity from an optical resonator may be detected by a detector, e.g., a photodetector, to produce an electrical signal with an amplitude indicative of the phase and amplitude modulations of the arriving optical signal. Accordingly, appropriate processing of the photodetector's electrical signal (e.g., analysis via signal processing that may include a processor executing an instruction set) may recover information encoded upon the modulation of the arriving optical signal. Systems and methods in accord with aspects and embodiments described herein allow for an optical resonator and a detector to be integrally provided as a compact and rugged component.

Figure 2:
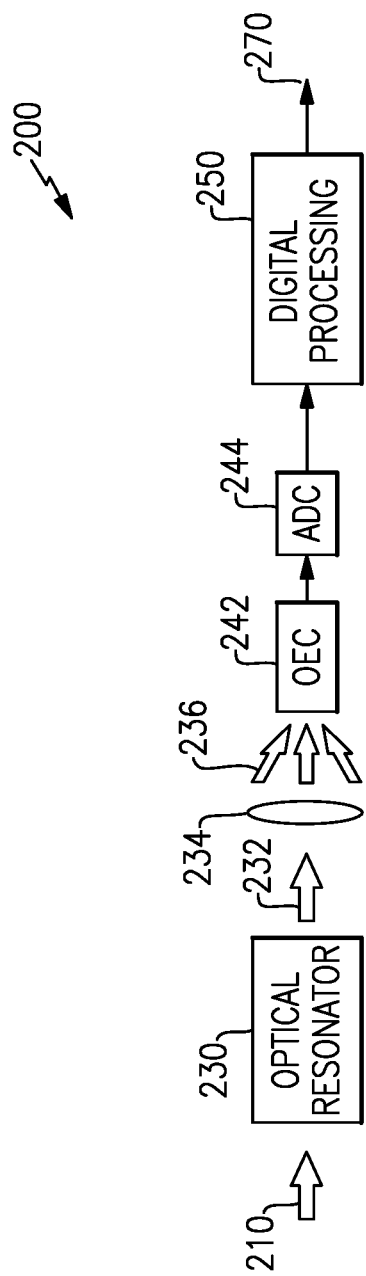
FIG. 2 is a block diagram of an optical receiver according to various examples described herein.

Referring to FIG. 2, illustrated is an example of an optical receiver 200 that may benefit from various examples discussed herein. The illustrated receiver 200 receives an optical signal 210 and includes an optical resonator 230 and a digital processing subsystem 250 that provides an output 270. The optical resonator 230 may be coupled to the digital processing subsystem 250 by a photodetector 242 and an analog to digital converter 244, for example.

Examples of optical resonators 230 may include Fabry-Perot etalons, various bulk resonators, or other types of resonators. The optical resonator 230 is a component capable of sensing transitions, such as phase transitions, representative of modulation of the received optical signal 210, and transforming the transitions into intensity modulation of an output optical signal, e.g., output optical signal 232. The optical resonator 230 converts the modulation of the arriving optical signal 210 in part by interaction of the arriving optical signal 210 with optical signal energy built-up or held in the optical resonator 230.

An optical signal received by an optical resonator 230 may establish a steady-state condition in which optical signal energy continuously arrives at the resonator, accumulates or adds to built-up energy existing inside the resonator, and emerges from the resonator at a constant rate. A change in the arriving phase, frequency, or amplitude of the optical signal may disrupt the steady-state condition, and the light intensity emerging from the resonator is thereby disrupted, until a steady state condition is re-established. Accordingly, a change in phase, frequency, or amplitude of the arriving optical signal 210 causes a change in intensity of the emerging optical signal 232. Accordingly, an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by the photodetector 242, such as a photodiode, for example. Accordingly, the output of the photodetector 242 may be an amplitude modulated signal representative of the intensity-modulated optical signal 232. Certain embodiments may include an optic 234, e.g., a focusing lens, to modify the output optical signal 232, such as to provide a focused optical signal 236 to the photodetector 242. The output of the photodetector 242 may be converted to a digital form by an analog to digital converter, e.g., ADC 244. The digital signal is provided to the digital processing subsystem 250 for digital processing. The digital processing subsystem 250 processes the digital signal to retrieve the information-carrying content of the optical signal 210. Certain examples may use analog receiver circuitry and therefore may omit the ADC 224 and include analog processing rather than a digital processing system 250.

As discussed above, suitable optical resonators may include etalons or other structures. Some detail of at least one example of an etalon is discussed with respect to FIG. 3, which illustrates an example of an etalon 300. In particular, the etalon 300 may be used to convert phase and/or amplitude modulations of the received optical signal 210 into intensity modulations of the output optical signal 232. The intensity modulated output optical signal 232 may then be converted to an electrical signal by the photodetector 242.

Various details of the operation of an optical resonator functioning in cooperation with a photodetector for detecting and demodulating phase, amplitude, and/or other modulations may be found in co-pending U.S. patent application Ser. No. 15/679,470 filed on Aug. 17, 2017, and titled SYSTEMS AND METHODS FOR DEMODULATION OF PHASE MODULATED OPTICAL SIGNALS, and in co-pending U.S. patent application Ser. No. 15/725,457 filed on Oct. 5, 2017, and titled SYSTEMS AND METHODS FOR DEMODULATION OF PSK MODULATED OPTICAL SIGNALS, and in co-pending U.S. patent application Ser. No. 15/816,047 filed on Nov. 17, 2017, and titled DEMODULATION OF QAM MODULATED OPTICAL BEAM USING FABRY-PEROT ETALONS AND MICRORING DEMODULATORS, each of which is herein incorporated by reference in its entirety for all purposes.

Figure 3:
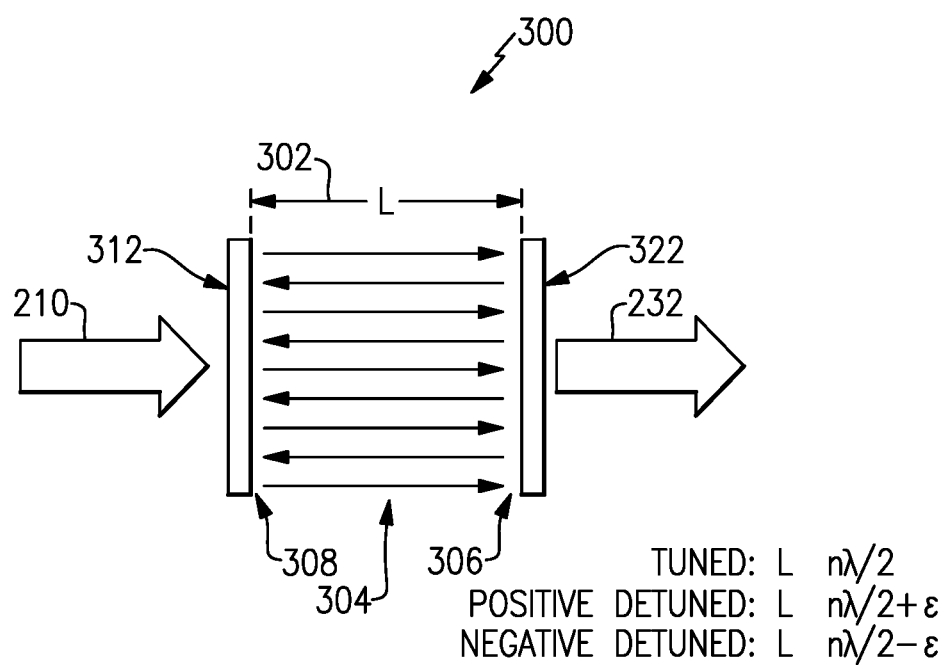
FIG. 3 is a schematic diagram of an example of an optical resonator.

FIG. 3 illustrates an example of an etalon 300 that includes an interior 304 having an optical interior dimension, L, (e.g. thickness 302), with semi-reflective surfaces 306, 308 that reflect optical signal energy into the interior 304. An input side 312 allows optical signal energy, such as the optical signal 210, into the interior 304. The input side 312 thereby forms an aperture through which the arriving optical signal 210 is received. An output side 322 forms an optical output, at least in part by action of the semi-reflective surface 306 to allow a portion of trapped optical signal energy from the interior 304 to emerge as an output optical signal, such as the output optical signal 232. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be r1=0.999 and an amplitude reflectivity of the second semi-reflective surface 306 may be r2=0.985. In other examples the reflectivity of each of the first and second semi-reflective surfaces may be different, and may be any suitable value for a particular implementation. The etalon 300 is one example of a suitable optical resonator in accord with aspects and embodiments described herein.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Optical resonators herein include structures of conventional characteristics as well as structures that may include interior reflectivity in a range which may be relatively low as compared to conventional examples. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed and fabricated to conform to a surface, or to have various regions responsive to differing wavelengths, or responsive to differing angles of arrival for a given wavelength, in certain examples.

Figure 4:
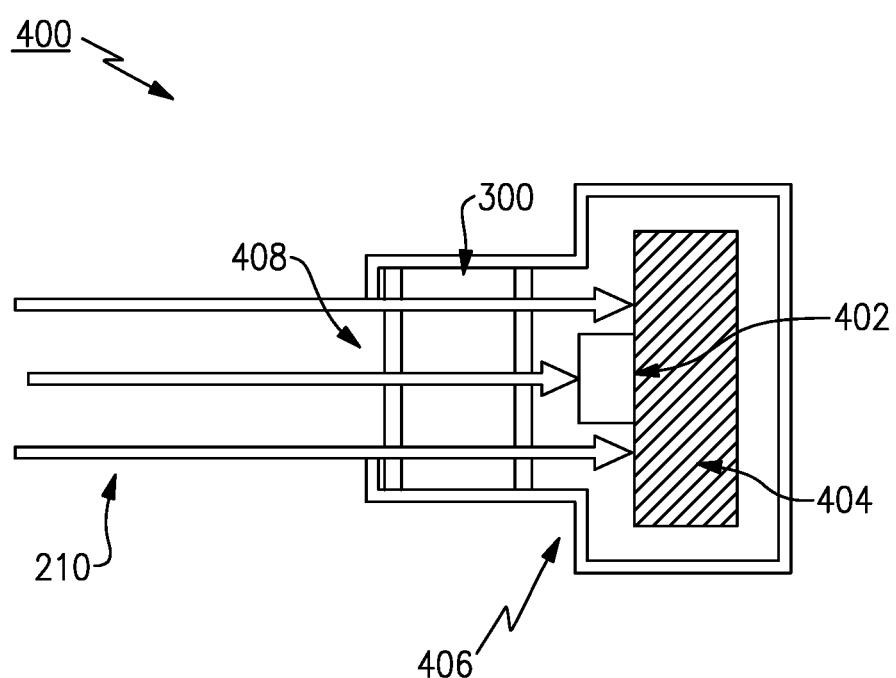
FIG. 4 is a schematic diagram of an example of a photodetector.

FIG. 4 illustrates an example of a packaged photodetector 400, which may be suitable for use, e.g., as the photodetector 242, in an optical receiver similar to that of FIG. 2. The photodetector 400 includes detector 402 that may be formed, for example, by conventional semiconductor fabrication techniques (e.g., a photo-diode). A substrate 404 may be included upon which the detector 402 is formed, and which may provide physical support and structural integrity to the detector 402. The detector 402 upon the substrate 404 may be contained in a package 406, such as a transistor outline (TO) case or canister (e.g., can), along with a window 408 that may provide protection of the detector 402 and substrate 404 from the external environment, yet allow an optical signal through. Various examples of a window 408 may be formed of crystal, glass, plastic, etc.

According to certain examples, an optical resonator, such as the etalon 300, is included with a photodetector, such as the photodetector 400, such that they are provided together in a single package and/or provided as an integral component, e.g., an optical resonator formed upon a portion of a photodetector. Accordingly, in various embodiments the optical resonator may provide an output optical signal substantially directly to the photodetector, for conversion to an electrical signal, and the optical resonator and the photodetector may be sufficiently aligned at the time of fabrication for suitable operation when deployed or used as a component in a receiver. In some embodiments, additional optics may be provided between the optical resonator and the photodetector, and such additional optics may be adjustable in some embodiments. In some embodiments, mechanical components may be provided that allow minor physical adjustment of either of the optical resonator or the photodetector, or both combined, to allow for, e.g., alignment correction and/or adjustment to an angle of incidence of an arriving optical signal.

FIG. 5A illustrates an example of an optical receiver 500a that is similar to the optical receiver 200 of FIG. 2 but includes a photo-resonant detector 510. The photo-resonant detector 510 includes an etalon (e.g., etalon 300) and a photodetector (e.g., photodetector 242) integrally formed as an optically aligned component. The etalon 300 and the photodetector 242 are optically aligned at fabrication, not configured to be separable, may be formed together as a multi-step semiconductor and/or thin film fabrication technique, and/or may be assembled in a package or housing (e.g., containing both of the optical resonator and photodetector) suitable for deployment in an optical receiver.

In various embodiments, optical resonators may be integrally formed on or with a photodetector substrate and/or on or with a "window," such as a glass or crystal window, of a photodetector package. Optical resonators may be formed on the photodetector itself or on a window, by various fabrication techniques, as a coating, thin film, laminate, membrane, partition, covering, etc. and may thereby include physical dimensions on the order of a fraction of a wavelength, a few wavelengths, tens or hundreds of wavelengths (or more), such that the optical resonator may be highly responsive to variations in an arriving optical signal. For example, an etalon of smaller physical dimension may reach steady-state more quickly than an etalon of larger physical dimension (e.g., the time for optical signal energy to build-up in the etalon may be shorter for a narrow etalon as compared to a thick etalon), and the steady-state condition in a small etalon may be more readily disturbed by a variation in the arriving optical signal. Accordingly, integrally formed etalons may be capable of providing modulation conversion for very high baud rates, in which the arriving optical signal includes a high rate of transitions, e.g., transitions that occur very close together in time, as compared to lower baud rates. Further, an optical resonator may be fabricated of various materials that may have various index of refraction, such that an optical length of the optical resonator may be significantly different from the physical length (or thickness) of the optical resonator in various embodiments.

FIG. 5B illustrates another example of an optical receiver 500b that is similar to the optical receiver 500a except that a further example of a photo-resonant detector 520 in the optical receiver 500b includes interior optics 234 that may adjust the optical signal 232 in various ways, such as by focusing the optical signal 232 into the focused optical signal 236. As with the photo-resonant detector 510, the photo-resonant detector 520 includes an etalon (e.g., etalon 300) and a photodetector (e.g., photodetector 242) integrally formed as an optically aligned component along with the optics 234.

Figure 6A:
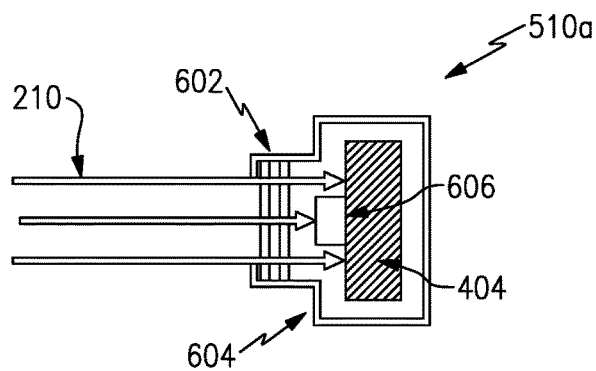
FIGS. 6A-6C are schematic diagrams of examples of optical resonant detectors in accord with various aspects described herein.

FIG. 6A illustrates a first example of a photo-resonant detector 510a. The photo-resonant detector 510a includes an etalon 602 as part of a window of a packaged photodetector, or as the window itself in some embodiments. In some embodiments, the etalon 602 may be interior to a window structure, and may be sandwiched between two window structures in some embodiments. In various embodiments, the etalon 602 may be held in suitable optical alignment with a detector 606 by the form of a package 604 (e.g., a tension or pressure fitting) and/or may be held in position within the package 604 by adhesive or various other securing means.

Similarly, in embodiments where the etalon 602 is within a window, or sandwiched between two window structures, the window structure(s) may be pressure fit or held by adhesive or secured by alternate means. Further in embodiments where the etalon 602 is within a window, or sandwiched between two window structures, one or more portions of the window structure(s) may include an anti-reflective coating to prevent the window structure(s) from acting as an additional reflective surface (e.g., prevent the window structure(s) from acting similar to the semi-reflective surfaces 306, 308 of an, e.g., etalon 300) that might otherwise interfere with operation of the etalon 602.

Figure 6B:
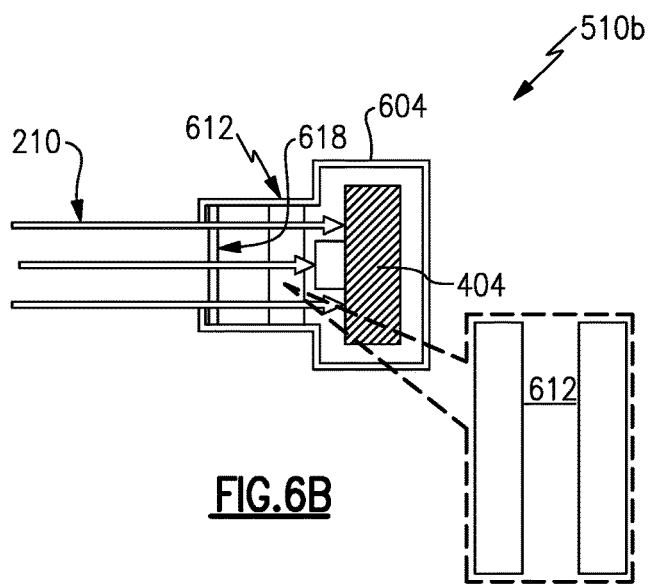

FIG. 6B illustrates a second example of a photo-resonant detector 510*b*. The photo-resonant detector 510*b* includes an etalon 612 formed on a surface of a window structure, e.g., as a coating, film, laminate, etc. that may include multiple layers (e.g., to form semi-reflective surfaces and interior region, as described above with respect to FIG. 3). In various embodiments, such an etalon 612 may be formed on an interior surface of a window (as shown), between the window portion and the detector material, or on a front and/or exterior surface of the window. In some embodiments, the photo-resonant detector 510*b* may include one or more anti-reflective coating(s) 618 on one or more portions of the window that may, as above, prevent the window structure from acting as an additional reflective surface that might otherwise interfere with operation of the etalon 612.

An etalon 612 formed on a surface of the window may be fabricated using various laminate, film, coating and/or semiconductor fabrication techniques. Various layers of an etalon 612 may be formed, in some cases as a layer-by-layer semiconductor growth technique (e.g., to result in a thin yet precise resonator), for example, of various materials suitably selected for optical characteristics such as reflectivity, transmissivity, index of refraction, etc. and formed of various thicknesses selected to cause the resulting etalon 612 to have varying performance and optical response characteristics, such as tuning to a particular wavelength and/or parameters selected for desired operational characteristics such as steady-state output level, transient signal shapes, and response times (e.g., timing of transient responses and returns to steady-state).

Figure 6C:
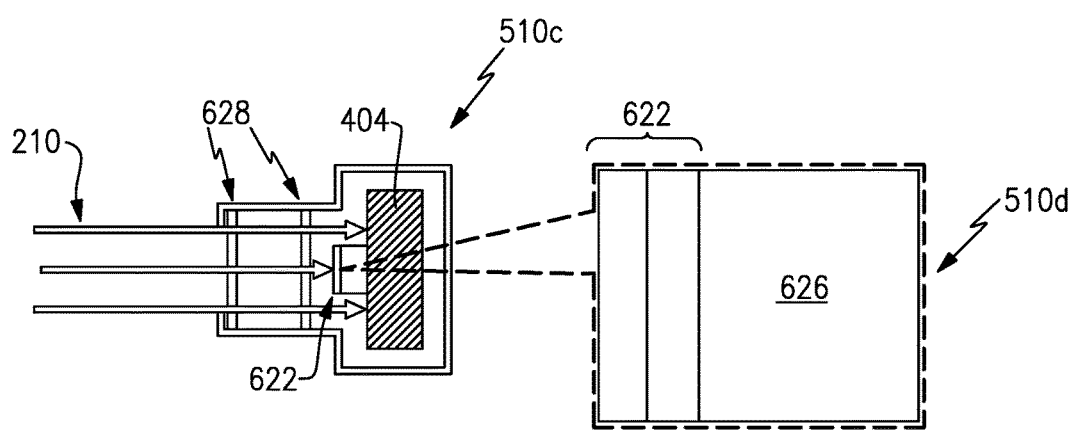

FIG. 6C illustrates a third example of a photo-resonant detector 510*c*. The photo-resonant detector 510*c* includes an etalon 622 formed on a surface of a detector 626. As above, the etalon 622 may be formed as a coating, film, laminate, etc., which may be formed layer-by-layer in some embodiments. The etalon 622 may be fabricated upon the detector 626 using various laminate, film, coating and/or semiconductor fabrication techniques, and may be included as one or more steps of the fabrication of the detector 626 in some embodiments. In some embodiments, the photo-resonant detector 510*c* may include one or more anti-reflective coating(s) 628 on one or more portions of a window that may, as above, prevent the window from acting as an additional reflective surface that might otherwise interfere with operation of the etalon 622. In some embodiments, the detector 626 with integrally formed etalon 622 may form a photo-resonant detector 510*d* that may be provided without a window or a package. In various embodiments, the detector 626 may form a substrate upon which the etalon 622 is formed. Similarly, in various embodiments, the etalon 622 may form a substrate upon which the detector 626 is formed. In some embodiments, various materials that form an optical resonator and various materials that form a photodetector may be grown together, such that the photodetector may be considered to exist inside the optical resonator, or the optical resonator may be considered to exist inside the photodetector, to form a photo-resonant detector in accord with aspects herein.

In various embodiments, an optical resonator may be formed using various laminate, film, coating and/or semiconductor fabrication techniques to provide a suitably thin etalon upon various materials or substrates, whether for independent use as an optical resonator, or upon a window for a photodetector, upon a photodetector itself, or otherwise incorporated with a photodetector.

Figure 7A:
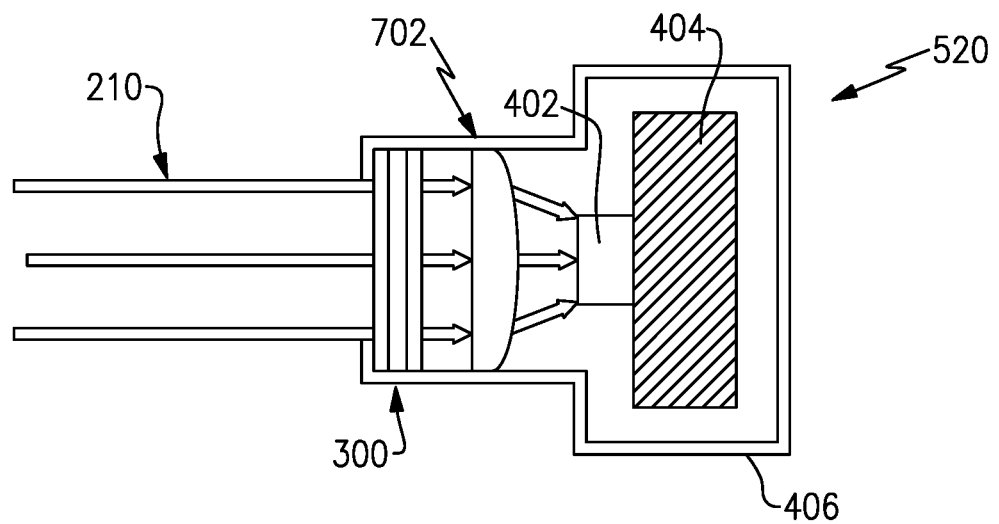
FIGS. 7A-7B are schematic diagrams of examples of options that may be incorporated with various optical resonant detectors as described herein.

Various options may be included in various embodiments of a photo-resonant detector in accord with aspects and embodiments described herein. For example, and with reference to FIG. 7A, any of various types of optics 702, such as lens, for example, may be provided within a package between an etalon 300 and a detector 402 to focus light from the etalon 300 onto the detector 402, and be, included in a photo-resonant detector 520. Such optics 702 may be secured in place by pressure fitting (e.g., a package or can), adhesive, or other means. In some embodiments, such optics 702 may be provided with micro-mechanical adjustment to allow for alignment and/or focal adjustment when placed in service.

Figure 7B:
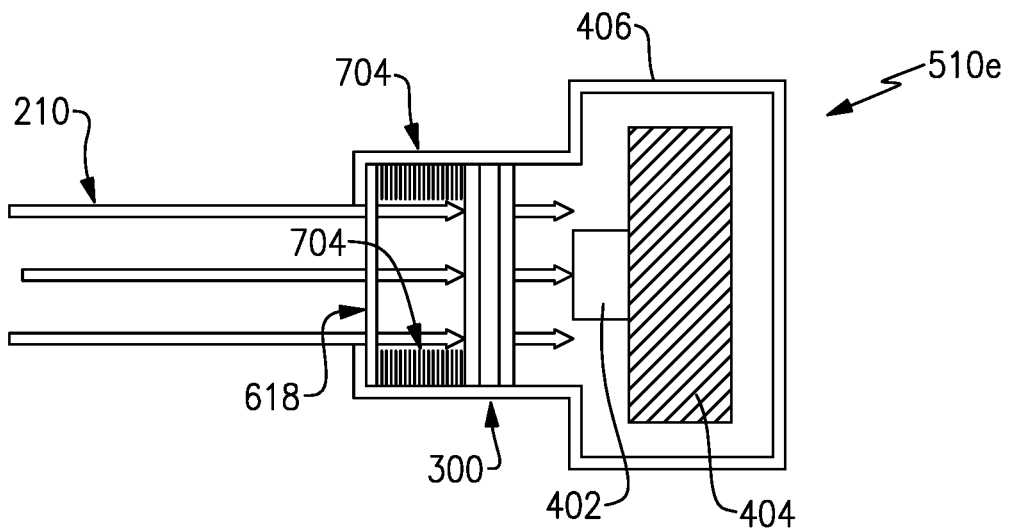

FIG. 7B illustrates an example of a further option, incorporated in a further example of a photo-resonant detector 510*e*. In this example, mechanical actuators 704 are provided in the photo-resonant detector 510*e* that may adjust a physical position and/or tilt of an etalon 300, to provide for adjustment of an optical alignment and/or an angle of incidence of an arriving optical signal 210, for example. Such mechanical actuators 704 may be, for example, piezoelectric components or other electromechanical actuators responsive to electrical signals for control, or other forms of mechanical actuator that may be responsive to acceleration, acoustics, or the arriving optical signal, for example.

In various embodiments, integrated optics 702 and/or integrated mechanical actuators 704 may be combined in one or more photo-resonant detectors in accord with aspects and embodiments herein. For example, integrated mechanical actuators 704 may be configured to make mechanical adjustment to optics 702 in some embodiments. As also shown in FIG. 7B, in certain examples, an anti-reflective coating 618 can be applied on the window, as discussed above.

It should be appreciated that the variation to output intensity caused by modulation of an arriving light signal may vary with resonant physical dimensions of an optical resonator, such as the dimensional length of an etalon, and how accurately it is manufactured, e.g., how well tuned the etalon is to one or more wavelengths. Output intensity from a tuned etalon with a smaller dimensional length is more quickly disrupted by a transition in the input signal, and more quickly re-establishes a steady state after such a transition, relative to a tuned etalon with a larger resonant dimension. Additionally, an etalon manufactured to a more accurate tolerance, i.e., more accurately tuned to the particular wavelength, may provide a higher steady-state output signal intensity and may exhibit greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, and how quickly and/or how strongly the etalon approaches a return to steady-state after a transition. Additionally, various etalon dimensions and tolerances may be selected to optimize a receiver, such as the receivers 500a, 500b, for a particular data rate and/or a particular wavelength.

Etalons integrally formed upon, and/or integrally included in a package with, a photodetector, in accord with aspects and embodiments herein, may be formed by various laminate, film, coating and/or semiconductor fabrication techniques, such as but not limited to: chemical, vapor, and/or ion deposition techniques; growing (e.g., crystal, semiconductor, Silicon); cladding; masking; etching; diffusion; spray coating; etc.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optically resonant detector comprising:
a housing having an optical window, the optical window configured to receive a light wave carrying encoded information incident at an input side of the optical window and traveling in a direction through the optical window;
a photodetector disposed within the housing; and
an etalon disposed between the input side of the optical window and the photodetector, the etalon formed on one of a surface of the photodetector and a surface of the optical window, and in optical alignment along the direction intersecting the optical window, the etalon being configured to receive the light wave at an input side of the etalon via the optical window, and being configured to provide at an output an output light wave to the photodetector, the light wave received at the input side of the etalon along the direction, wherein the received light wave is phase modulated, the output light wave is intensity modulated, and the etalon is configured to convert phase modulated light to intensity modulated light at the output.

2. The optically resonant detector of claim 1 wherein the etalon and the photodetector are integrally formed as a unitary structure inseparable without damage.

3. The optically resonant detector of claim 1 further comprising an anti-reflective coating formed on a surface of the optical window.

4. The optically resonant detector of claim 1 wherein the is an etalon is formed in an interior of the optical window, and wherein the light wave is a phase-modulated free-space optical signal.

5. The optically resonant detector of claim 1 wherein the etalon is formed on the surface of the optical window.

6. The optically resonant detector of claim 1 further comprising a lens positioned between the output of the etalon and the photodetector and configured to focus the output light wave into the photodetector.

7. The optically resonant detector of claim 6 further comprising a mechanical actuator configured to adjust a physical position of at least one of the etalon, the photodetector, and the lens in response to a control signal.

8. The optically resonant detector of claim 1 wherein the photodetector is configured to provide an electrical signal based on the received light wave, an amplitude modulation of the electrical signal being representative of a phase modulation of the received light wave.

9. The optically resonant detector of claim 1 wherein the surface of the photodetector is modified to control the reflectivity of the surface of the photodetector.

10. The optically resonant detector of claim 1 wherein the etalon includes a first semi-reflective surface and a second semi-reflective surface parallel to the first semi-reflective surface, the input side of the etalon is the first semi-reflective surface, the surface of the photodetector includes the output, and the etalon is formed on the surface of the photodetector by forming the second semi-reflective surface on the surface of the photodetector.

11. An optical receiver comprising:
a photo-resonant detector including an integrally formed and optically aligned combination of an optical window, a photodetector and an etalon along a direction intersecting the optical window, the etalon and the photodetector, the etalon disposed between an input side of the optical window and the photodetector, the etalon formed on one of a surface of the photodetector and a surface of the optical window, the optical window configured to receive a light wave carrying encoded information incident at the input side of the optical window and traveling in the direction through the optical window, the etalon configured to receive the light wave from the optical window and to provide at an output an output light wave to the photodetector, the photodetector configured to provide an electrical signal based on the received light wave, an amplitude modulation of the electrical signal being representative of a modulation of the received light wave;
an analog to digital converter configured to receive the electrical signal from the photo-resonant detector and convert the electrical signal into a digital signal; and a digital processing subsystem configured to receive and process the digital signal, wherein the received light wave is phase modulated, the output light wave is intensity modulated, and the etalon is configured to convert phase modulated light to intensity modulated light at the output.

12. The optical receiver of claim 11 wherein the photo-resonant detector further includes a housing having the optical window, the photodetector and the etalon being disposed within the housing and arranged such that the etalon is positioned between the optical window and the photodetector.

13. The optical receiver of claim 12 wherein the etalon is configured to receive the light wave via the optical window and to provide the output light wave carrying the encoded information to the photodetector, the photodetector being configured to convert the output light wave into the electrical signal, the output light wave having an intensity modulation representative of the modulation of the received light wave.

14. The optical receiver of claim 13 wherein the is an etalon is formed in an interior of the optical window.

15. The optical receiver of claim 13 wherein the is an etalon is formed on the surface of the optical window.

16. The optical receiver of claim 12 wherein the photo-resonant detector further includes an anti-reflective coating formed on a surface of the optical window.

17. An optical receiver comprising:
a photo-resonant detector including a housing having an optical window, a photodetector disposed within the housing, and an etalon disposed within the housing, in optical alignment with the optical window and the photodetector, and positioned between the optical window and the photodetector, the etalon formed on one of a surface of the photodetector and a surface of the optical window, the etalon being configured to receive an input optical signal at an input side of the etalon via the optical window and to provide an output light wave to the photodetector, the photodetector being configured to convert the signal light wave into an electrical signal;
an analog to digital converter configured to receive the electrical signal from the photo-resonant detector and convert the electrical signal into a digital signal; and
a digital processing subsystem configured to receive and process the digital signal, wherein the received optical signal is phase modulated, the output light wave is intensity modulated, and the etalon is configured to convert phase modulated light to intensity modulated light.

18. The optical receiver of claim 17 wherein the etalon is configured to provide the output light wave having an intensity modulation representative of a modulation of the input optical signal, and wherein the electrical signal has an amplitude modulation representative of the intensity modulation of the output light wave.

19. The optical receiver of claim 18 wherein the photo-resonant detector further includes a lens positioned between the etalon and the photodetector and configured to focus the output light wave into the photodetector.

20. The optical receiver of claim 19 wherein the photo-resonant detector further includes a mechanical actuator configured to adjust a physical position of at least one of the etalon, the photodetector, and the lens in response to a control signal.

21. The optical receiver of claim 17 wherein the etalon and the photodetector are integrally formed as a unitary structure inseparable without damage.

22. The optical receiver of claim 17 wherein the photo-resonant detector further includes an anti-reflective coating formed on a surface of the optical window.

* * * * *